United States Patent [19]

Leonhart

[11] 4,028,166
[45] June 7, 1977

[54] APPARATUS FOR LAMINATING SHEET MATERIAL
[75] Inventor: Charles J. Leonhart, Carol Stream, Ill.
[73] Assignee: Nuarc Company, Inc., Chicago, Ill.
[22] Filed: Oct. 28, 1975
[21] Appl. No.: 626,362
[52] U.S. Cl. ............................ 156/382; 100/211; 156/497; 156/580; 355/93
[51] Int. Cl.² ................... B30B 9/22; G03B 27/20
[58] Field of Search .......... 156/382, 497, 580, 286, 156/381; 355/87, 91, 93

[56] References Cited
UNITED STATES PATENTS

| | | | |
|---|---|---|---|
| 1,855,356 | 4/1932 | Koppe | 355/87 |
| 3,042,356 | 7/1962 | Audino | 355/91 |
| 3,146,143 | 8/1964 | Bolesky et al. | 156/382 |
| 3,694,081 | 9/1972 | Keller | 355/91 |
| 3,738,890 | 6/1973 | Johnson et al. | 156/382 X |
| 3,888,719 | 6/1975 | Gibbs et al. | 156/382 X |

Primary Examiner—Charles E. Van Horn
Assistant Examiner—M. G. Wityshyn
Attorney, Agent, or Firm—Mason, Kolehmainen, Rathburn & Wyss

[57] ABSTRACT

Apparatus for laminating pieces of sheet material comprising a base of rigid material having a flat upper surface formed with a plurality of spaced apart perforations distributed substantially uniformly over the surface, a support member having a flat upper surface supporting an underside of said base and having a plurality of concentric interconnected grooves defined and in communication with said perforations, means for developing a partial vacuum in said grooves for causing fluid flow through said perforations around one or more pieces of sheet material placed in contact with the upper surface of the base, a cover of flexible, fluid impervious transparent sheet material movable between an open position out of overlaying relation with said base and a closed or overlaying position covering said base along with any pieces of sheet material places on the base to be laminated together and means for sealing around the periphery of said base and said cover when said cover is in said overlaying position.

2 Claims, 6 Drawing Figures

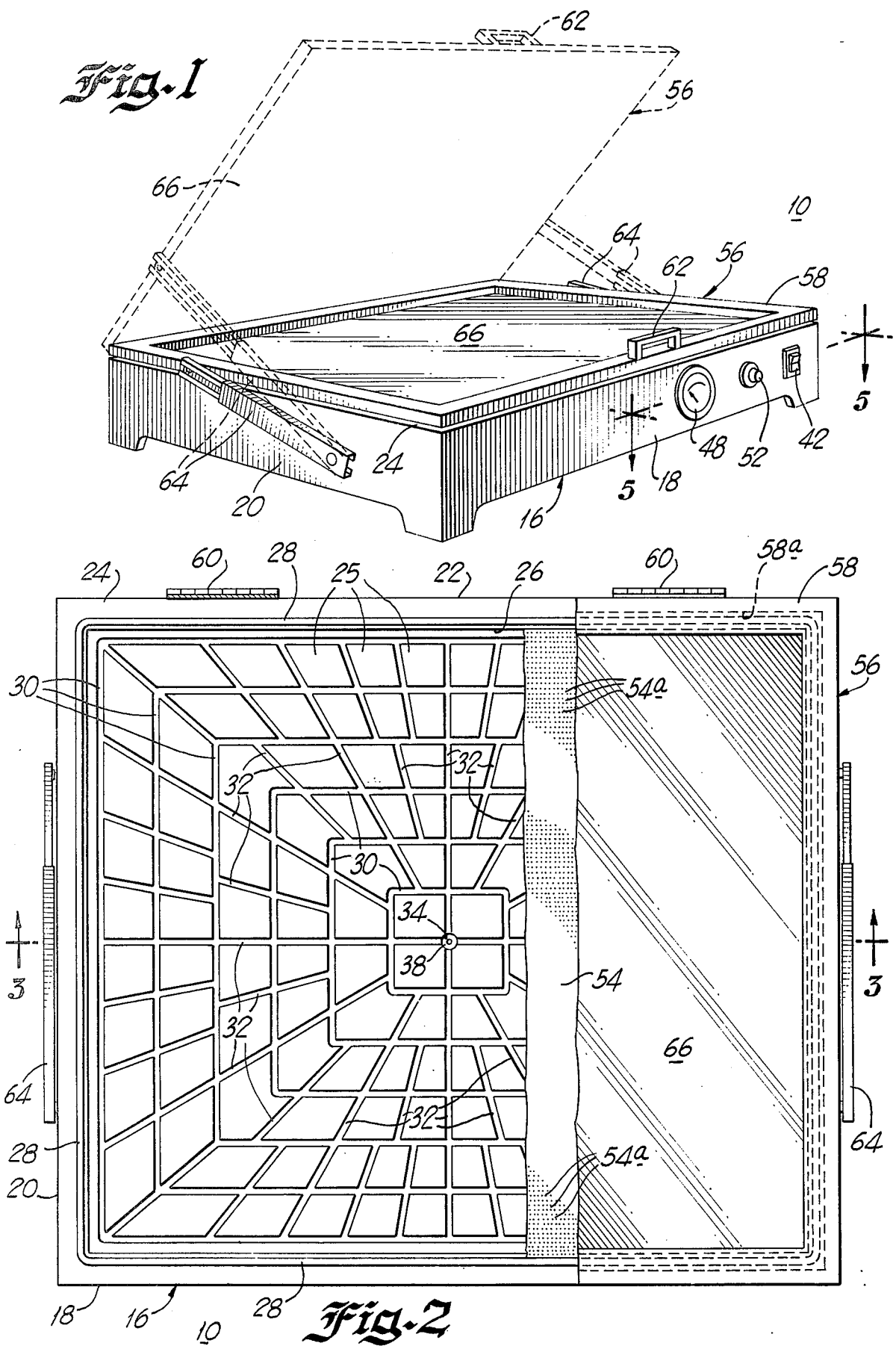

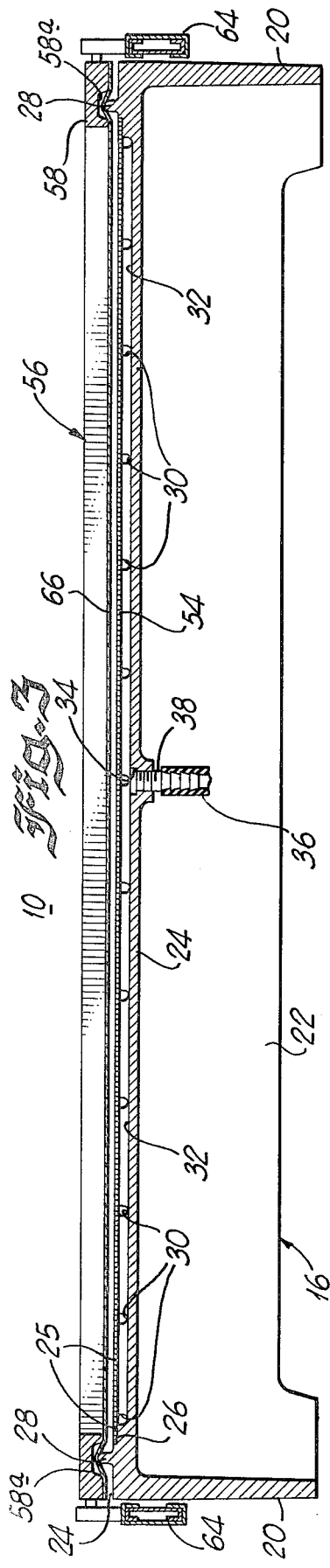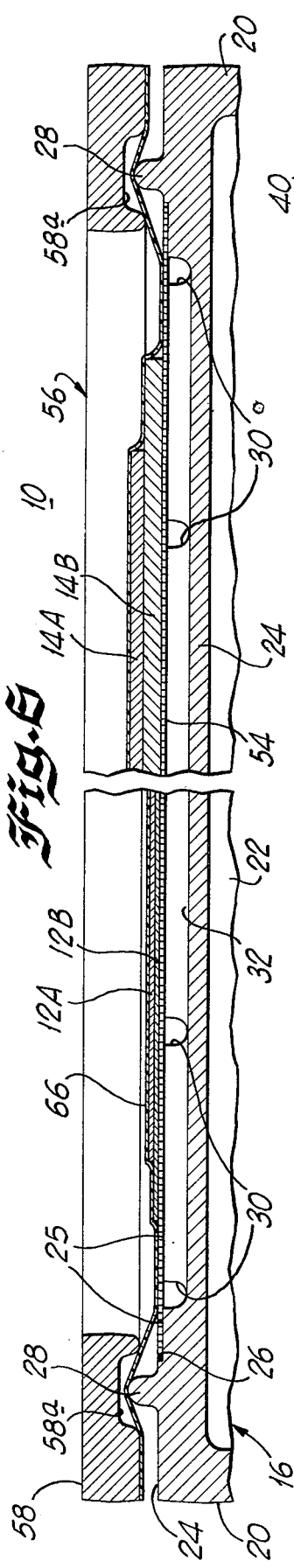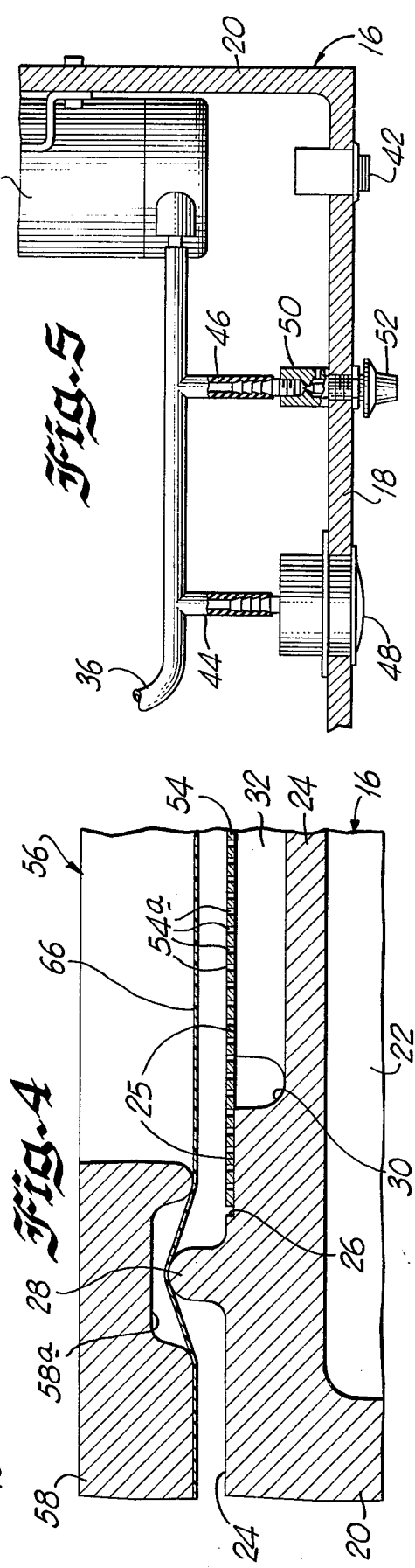

APPARATUS FOR LAMINATING SHEET MATERIAL

BACKGROUND OF THE INVENTION

1. Field of the Invention

The present invention relates to a new and improved apparatus for laminating together pieces of sheet material with an adhesive for effecting a bond between the laminated sheets. The apparatus is useful in adhesively securing photographs, prints, drawings, etchings and other decorative or informational media to bases or backer board members of varying thickness and consistencies and is particularly useful in art and graphic make up and layout work wherein pressure sensitive adhesive materials are used for bonding together sheet materials of varying thickness, size and surface characteristics.

2. Description of the Prior Art

One prior art device comprises a photographic printer as shown in U. S. Pat. No. 3,043,204 which employs a glass pane for supporting sheet materials such as photographic film and the like and the sheets are held in place against the glass pane by means of a flexible rubber mat having a plurality of small protuberances distributed over the surface thereof. The area between the flexible rubber mat and the glass pane is evacuated for holding the photographic film in place against the glass pane. An apparatus in accordance with the present invention provides a new and improved system for laminating together pieces of sheet material with pressure sensitive adhesives and can accomodate sheets of varying thickness, size and surface textures.

It is an object of the present invention to provide a new and improved laminating device of the character described.

Another object of the invention is to provide a new and improved laminating apparatus which is simple of construction, light in weight and easy to operate.

Yet another object of the present invention is to provide a new and improved apparatus of the character described wherein a flexible cover of transparent sheet material is provided to effect a pressure seal against the sheet material to be laminated together so that the sheets may be viewed at all times during the laminating process.

Yet another object of the present invention is to provide a new and improved laminating apparatus of the character described which is capable of handling several pieces of sheet materials of various different thicknesses and different sizes at the same time while providing a positive seal around the periphery of each sheet during the laminating process.

Still another object of the present invention is to provide a new and improved laminating apparatus of the character described which can be fabricated mainly from molded plastic material with a minimum of metal components being required.

The foregoing objects and advantages of the present invention are accomplished in an illustrated embodiment thereof comprising a new and improved laminating apparatus for use in laminating sheet materials with pressure sensitive adhesive. The apparatus comprises a base of rigid plastic material having a flat upper surface formed with a plurality of spaced apart perforations distributed in a substantially uniform pattern over the surface. A support member having a flat upper surface is provided for supporting an underside of the base and is formed with a pattern including a plurality of concentric, interconnected grooves defined to lie in communication with many of the perforations in the base. Means such as a pump is provided for developing a partial vacuum in the grooves for evacuating fluid flow through the perforations around one or more pairs of sheet material which have been placed in contact with the upper surface of the base for lamination. A cover comprising a flexible, fluid impervious transparent sheet material is mounted on a hinged frame for movement between an open position away from the base and a closed position overlaying the base and covering the base and the pieces of sheet material placed thereon for lamination. A peripheral seal is provided around the periphery between the base and the impervious cover which then conforms to the size and thickness of the laminated sheet materials thereon when the cover is placed in the closed overlaying position. A vacuum pump is provided to pull a vacuum on the grooves in the support base so that the cover seals around the sheet materials and the pressure sensitive adhesive is activated by the atmospheric pressure acting through the cover on the pieces of sheet material together while in full view through the impervious transparent flexible sheet material of the cover. After the lamination process is completed with the adhesive set sufficiently, the vacuum is released and the cover is opened so that the laminated together sheets may be withdrawn from the apparatus.

BRIEF DESCRIPTION OF THE DRAWINGS

For better understanding of the invention, reference should be had to the following detailed description taken in conjunction with the drawings in which:

FIG. 1 is a front perspective view of a new and improved laminating apparatus constructed in accordance with the features of the present invention;

FIG. 2 is a top plan view of the apparatus with portions broken away showing internal details of the construction;

FIG. 3 is a vertical cross-sectional view taken substantially along lines 3—3 of FIG. 2;

FIG. 4 is a fragmentary vertical sectional view similar to FIG. 3 and illustrating the sealing arrangement between the cover and a support base of the apparatus;

FIG. 5 is a schematic diagram illustrating the vacuum system of the apparatus; and FIG. 6 is a vertical sectional view similar to FIG. 3 illustrating the apparatus in use with pieces of sheet material in place for lamination.

DESCRIPTION OF THE PREFERRED EMBODIMENT

Referring now more particularly to the drawings, therein is illustrated a new and improved laminating apparatus especially adapted for laminating together pieces of sheet material with a pressure sensitive adhesive. The laminating apparatus is referred to generally by the reference numeral 10 and is especially well adapted to laminating together pairs of sheet materials 12A and 12B and 14A and 14B (FIG. 6) of different thicknesses and different sizes. Contacting surfaces of the sheet materials are coated with a suitable pressure sensitive adhesive so that after pressure has been applied in the apparatus for a suitable length of time allowing the adhesive to set, the laminates are firmly and securely bonded together in overlaying position as desired.

The laminating apparatus includes a base support 16 preferably constructed of integrally molded, strong and light weight plastic material such as polyurethane resin and the base support includes a front wall 18, a pair of side walls 20, and a rear wall 22 all integrally interconnected with a flat top wall 24 having a recessed planar upper surface 25. The surface 25 is formed within a shallow recess 26 (FIG. 4) for receiving a sheet of base material and around the periphery the top wall includes an upstanding sealing ridge 28 spaced inwardly from the outer edges of the base member as best shown in FIGS. 2, 3 and 4. The recessed planar surface is grooved with a plurality of generally rectangular, concentric spaced apart grooves 30 arranged in a pattern as shown best in FIG. 2 and these grooves are interconnected with radial grooves 3 radiating outwardly from a central aperture 34 formed at the center of the top wall 24. The grooves 30 and 32, and the central aperture 34 are in communication with a vacuum hose or tube 36 by means of a metal hose connector 38 which is preferably molded in place (as best shown in FIG. 3) at the center of the top wall 24. The vacuum hose is connected at the opposite end with a vacuum pump 40 which is electrically powered and controlled by a switch 42 preferably mounted on the front wall 18 of the base support structure 16. The vacuum hose 36 is connected to a pair of branch conduits 44 and 46 (as shown in FIG. 5) with the conduit 44 connected to a vacuum gauge 48 mounted on the front wall 18 of the base support structure and the conduit 46 connected to a bleed valve 50 also mounted on the front wall. A knob 52 is provided for operator control of the bleed valve to release or control the amount of vacuum drawn on the vacuum line 36 by the vacuum pump 40. When the pump 40 is turned on by the switch 42, a vacuum is drawn on the line 36 which in turn draws air from the grooves 30 and 32 formed in the upper face of the top wall 24. The bleed valve 50 adjusted with a knob 52 to provide the desired amount of vacuum as registered by the vacuum gauge 48. When a laminating job is completed, the vacuum pump may be shut down and/or the vacuum may be released by the turning of the knob 52 to control the bleed valve.

In accordance with the present invention, a thin sheet of strong rigid, plastic material 54 having a flat or planar upper surface is mounted in the shallow recess 26 of the base support. This base 54 is provided with a pattern comprising a plurality of small perforations 54a substantially uniformly distributed over the entire surface. Many of the perforations are in direct communication with the groove pattern formed in the top wall 24.

The apparatus 10 includes a cover assembly 56 comprising a peripheral frame 58 also preferably formed of molded plastic material and hingedly attached along a rear member with the rear wall 22 of the base support structure 16 by a plurality of hinges 60. A handle 62 is mounted on a forward frame member for lifting the cover from a closed or overlaying position (as shown in solid lines in FIG. 1) to an open position (dotted lines) and a pair of extensible support arms 64 are pivotally interconnected at opposite ends to the side walls 20 of the base support structure and the side members of the frame 58 of the cover assembly 56 to hold the frame in an open position when desired. On the underside of the frame 58 (FIG. 4), there is provided a thin sheet of fluid impervious, substantially transparent, flexible plastic sheet material forming a top cover 66 for the apparatus for sealing around the pieces of materials such as the sheets 12A and 12B or 14A and 14B which are placed on the base 54 for lamination. The underside of the frame 58 of the cover assembly is formed with an integral groove 58a and the flexible cover 16 is bonded to the frame members outwardly of the groove. The cover 66 extends across this groove and is deflectable into the groove when the cover is closed as shown in FIGS. 3, 4 and 6 to effect a peripheral seal in combination with the upstanding ridge 28 on the base support structure 16. In addition, because the top cover 66 is formed of fluid impervious flexible material, it readily conforms to the thickness and shapes of the sheet materials 12A, 12B and 14A, 14B which are placed on the apparatus for laminating. As shown in FIG. 6 when a vacuum is drawn on the space between upper surface of the base 54 and the underside of the top cover sheet 66 the cover is forced downwardly by ambient air pressure to conform to the shape and thickness of the sheets placed on the base to be laminated together. As shown best in FIG. 6, it will be seen that sheets of different thicknesses and different shapes or sizes can be handled simultaneously as the flexible cover conforms to closely seal around the periphery thereof against the base 54 as the vacuum is drawn by the pump 40. Any remaining air or vapors from the adhesives used that are present in the region between the lower surface of the cover 66 and the upper surfaces of the base 54 or sheet materials 12A and 12B are evacuated through the small perforations 54a in the base 54. Removal of any vapors from the adhesive being used speeds the process and aids the pressure differential as established by the vacuum in firmly bonding the sheets together and setting the adhesive between the laminated sheets 66. Because the cover is transparent, the sheets to be laminated may be accurately pre-positioned and then viewed after the cover assembly is closed before the process of adhesion has been started by turning on the vacuum pump 40. This results in extremely accurate placement of the sheets to be laminated one on the other and provides for continuous visual observation.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. Apparatus for laminating pieces of sheet material together with adhesive comprising:
   a base of rigid material having a flat upper surface formed with a plurality of relatively small size, spaced apart perforations distributed substantially uniformly over said surface;
   a rigid base support member having a flat upper surface supporting an underside of said base and having a plurality of concentric grooves interconnected with a plurality of grooves radiating outwardly of a central portion of said support member, said grooves underlying and in communication with said perforations and an upstanding peripheral rib projecting above said flat surface of said base and spaced outwardly of said perforations;
   means in communication with said grooves in said central portion of said base support member for developing a partial vacuum in said grooves for causing fluid flow through said perforations around one or more pieces of sheet material placed in contact with said upper surface of said base;

a cover of flexible fluid impervious transparent sheet material movable between non-overlaying and overlaying positions on said base and pieces of said sheet material placed on said base to be laminated together;

and means for sealing between peripheries of said base outwardly of said concentric grooves and said cover when in said overlaying position including a peripheral rigid frame supporting a peripheral edge portion of said flexible cover and mounted for pivotal movement relative to said base between said non-overlaying and said overlaying positions of said cover, said rigid frame including a groove around the periphery of said rigid frame confronting said rib when said flexible cover is in said overlaying position, said peripheral edge portion of said flexible cover extending across said groove and deflectable into said groove into sealing engagement against said rib when said cover is in said overlaying position.

2. The apparatus of claim 1 wherein said sealing means includes an inner peripheral edge portion of said flexible cover and the combination of a plurality of perforations in a row adjacent an edge portion of said base and an outer concentric groove in said base support member in communication with said perforations in said row.

* * * * *